Feb. 16, 1926.

V. C. KLINE

DRAFT MECHANISM

Filed April 14, 1925   3 Sheets-Sheet 1

1,573,320

INVENTOR

Virgil C. Kline

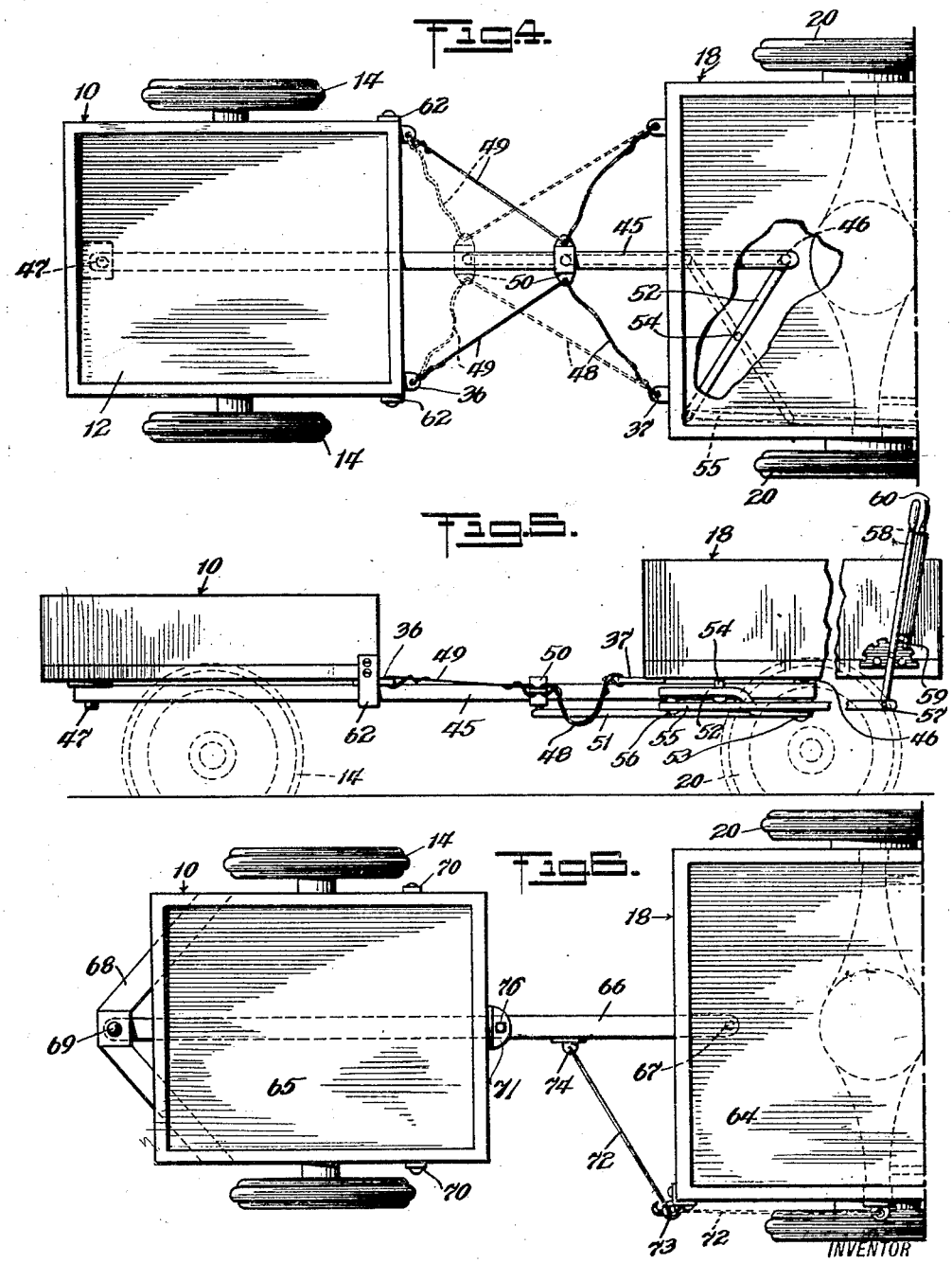

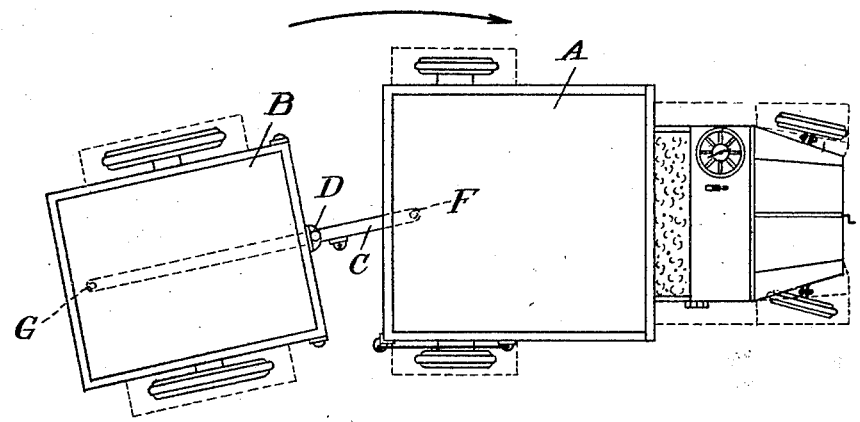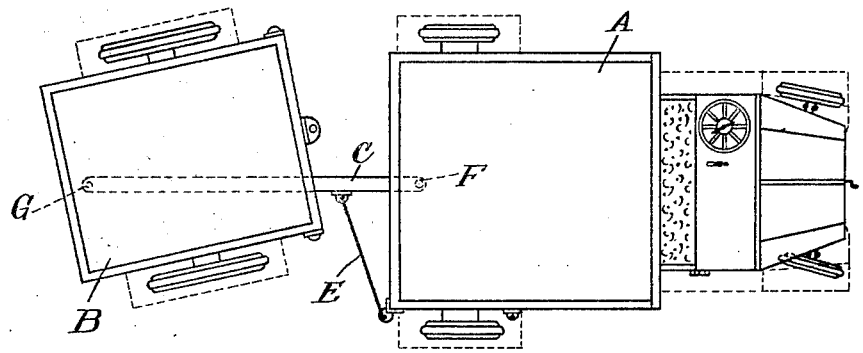

Patented Feb. 16, 1926.

1,573,320

UNITED STATES PATENT OFFICE.

VIRGIL C. KLINE, OF FAR ROCKAWAY, NEW YORK.

DRAFT MECHANISM.

Application filed April 14, 1925. Serial No. 22,946.

*To all whom it may concern:*

Be it known that I, VIRGIL C. KLINE, a citizen of the United States, and a resident of Far Rockaway, in the county of Queens and State of New York, have invented certain new and useful Improvements in Draft Mechanisms, of which the following is a specification.

This invention relates to improvements in truck and trailer combinations and in particular to an improved draft and steering connection thereof.

It is a primary object of the invention to provide a trailer construction which will permit the same to be drawn forwardly or rearwardly with equal facility or in other words to have the action of the trailer while moving rearwardly simulate the action of a forwardly moving trailer by being drawn from a point in advance of the vertical plane of the rotative axis of the supporting wheels thereof so that there will be no tendency on the part thereof to buckle or become otherwise out of control whether the trailer is being moved forwardly or rearwardly.

It is a further object to provide a simple and relatively inexpensive mechanism of the character referred to.

It is a still further object to provide a trailer coupling mechanism which can be used upon any usual type of trailer body and running gear.

Other and more specific objects will appear as the description thereof proceeds.

In the drawings:

Figs. 4 and 5 are respectively plan and elevational views of a modified form of the invention parts being broken away.

Fig. 6 is a plan view of another modification thereof..

Figs. 7 and 8 are diagrammatic views of a truck and trailer combination showing the position the parts assume while turning.

There has always been experienced considerable difficulty in the use of trailers because of the impossibility of backing them under control, since the trailer tends to turn aside or "buckle" with respect to the pushing unit. While there have been certain attempts at a solution of this problem the prior constructions have been either too cumbersome and expensive to be adopted or they have proven otherwise unsuited for their intended purpose. This invention contemplates overcoming the difficulties referred to by providing a double acting drawbar which can be connected permanently to the trailer and which is designed to draw the trailer from the advance end thereof whether the trailer is being moved forwardly or rearwardly. It is recognized that there are many ways of accomplishing this result and that the invention may assume many different forms without departing from the basic principle of my invention.

Figure 1:
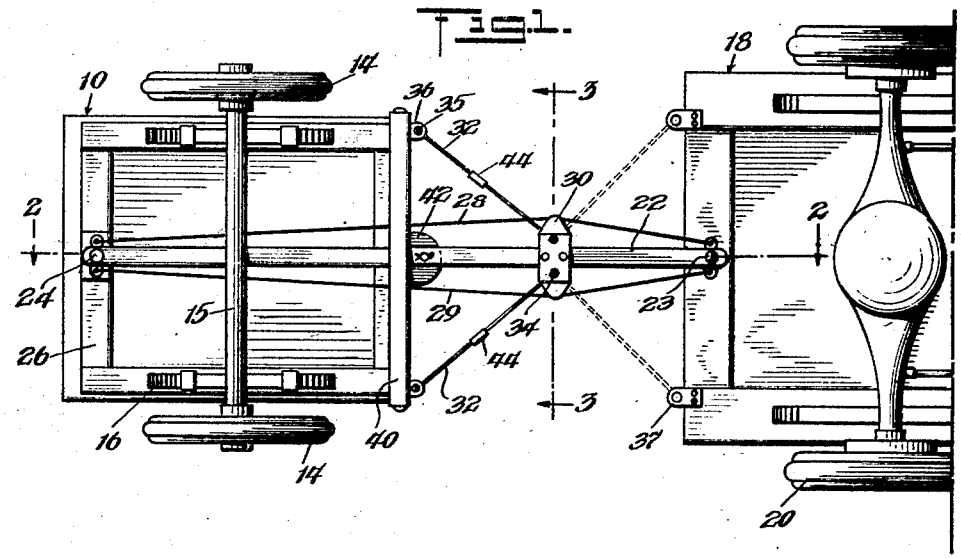
Fig. 1 is a bottom plan view of a trailer vehicle and a portion of a drawing unit showing my invention applied thereto.
Figure 2:
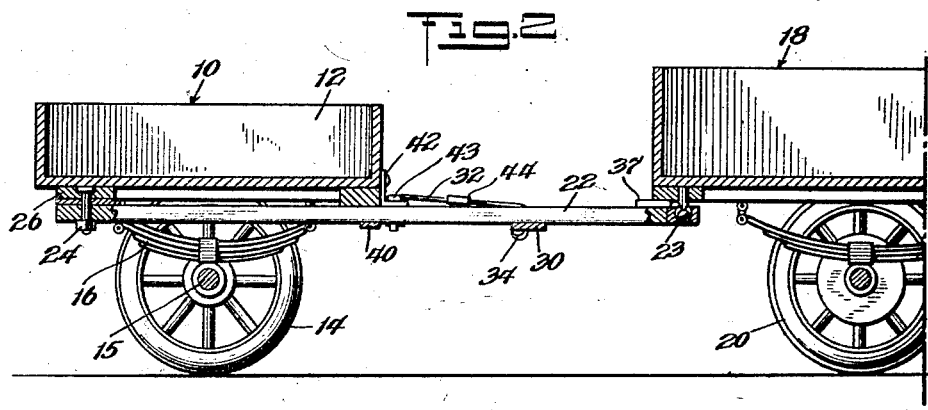
Fig. 2 is a vertical section on the line 2—2 of Fig. 1.
Figure 3:
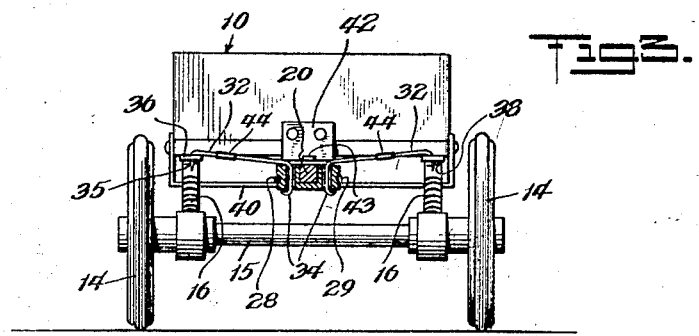
Fig. 3 is a front view of the trailer vehicle, parts being in section, and taken substantially on the line 3—3 of Fig. 1.

Referring to the details of the drawings wherein like numerals indicate like parts, Figs. 1 to 3 illustrate the first form of the invention. The trailer indicated generally at 10 includes any preferred body construction 12 supported by the single pair of wheels 14 mounted on the axle 15. The body is supported on the axle in the embodiment shown by means of springs 16 although it is obvious that such are not essential. All of the above described parts may be of any preferred construction, the details thereof forming no part of my present invention. The drawing unit indicated generally at 18 and having the rear supporting wheels 20 is shown more or less diagrammatically since further details thereof are not necessary to a complete understanding of the invention. The drawing unit will be understood to be any form of truck or tractor and will in general be referred to as the truck as distinguished from the trailer drawn therefrom.

The trailer is secured to the truck by means of the drawbar 22 pivotally connected near the rearward portion of the truck as at 23 and to the trailer at some point rearwardly of the vertical plane of the axis of the wheels thereof. The pivotal point 24 of the drawbar and trailer is preferably placed as far in rear of the trailer wheels as possible and is accordingly shown as connected to the rear cross bar 26 of the trailer frame. The drawbar may be provided with the reenforcing struts 28 and 29 secured to the same at or near the ends thereof and passing over the spacing block 30. This construction affords ample strength for any usual type of trailer.

The drawbar 22 is designed to be pivotally or rigidly connected to either the truck or trailer. To this end the rods 32 are pivotally connected to the drawbar and preferably to the block 30 thereon as shown at 34 although the specific manner of accomplishing this is not material. The rods 32 are shown with hooked ends 35 adapted to be passed through the retaining brackets 36 on the trailer or to be moved about the pivots 34 and secured to the truck as by being passed through the brackets 37 thereon. The hooked ends 35 are preferably secured in position in the brackets by means of pins or spring latches as shown for example at 38.

In order to support the trailer body from the drawbar 22, a transverse guide member 40 is shown as secured to the sides of the trailer body the guide member passing across the front portion thereof in spaced relation to the frame part to form a guiding slot or pocket in which the drawbar moves during its pivotal movements with respect to the trailer frame.

An additional safety lock may be provided in the form of an apertured plate 42 secured in the center of the trailer at the forward portion thereof. A locking pin 43 may then be passed through the holes in the plate 42 and drawbar 22 as an additional precautionary measure against the drawbar pivoting with respect to the trailer when it is not so intended.

The rods 32 may be formed in any desired manner and I do not desire to be limited to the construction herein shown. It is considered desirable to have some form of adjustment therefor and to this end the adjustable connections 44 may be used thereon so as to keep the rods in substantially taut condition when secured to the trailer or truck.

The operation of this form of the invention is substantially the same as that shown in Figs. 7 and 8 and set forth in detail below.

According to the form of the invention shown in Figs. 4 and 5 the truck and trailer may as in the first form be constructed in any desired manner. The drawbar 45 is pivoted to the truck and trailer at 46 and 47 respectively as in the first form of the invention. The mechanism for causing the drawbar to be prevented from swinging with respect to the truck or trailer is designed to be operated from a point adjacent the driver's seat. As shown the two pairs of cables or chains 48 and 49 are connected respectively to the truck and trailer and to the member 50 slidably mounted on the drawbar. An actuating rod 51 is pivoted to member 50 and to one end of the lever 52 as at 53, the lever being pivotally connected to some convenient part of the truck frame as indicated at 54. The lever 52 is adapted to be actuated by the shaft 55 pivotally connected thereto as at 56 and to the hand lever 58 as at 57. The hand lever may be provided with some convenient form of locking mechanism 59 controlled by the hand grip 60 so that it can be locked in its adjusted positions.

The pivot 53 when moved to its forward position as shown for example in full lines in Figs. 4 and 5 should be arranged approximately in vertical alinement with the pivot 46 of the drawbar so that the cables will not be influenced by swinging of the drawbar about the pivot 46 when the trailer is connected for moving forwardly. A suitable guide 62 is preferably arranged across the front end of the trailer frame beneath the drawbar to assist in balancing the trailer as in the first form of the invention.

According to the construction shown in Figs. 4 and 5 it will be seen that on a forward movement of the lever 58 the collar 50 is moved forwardly so as to tension the rear cables or chains 49. The trailer is then in condition to be moved forwardly. A reverse movement of the hand lever 58 moves the collar 50 rearwardly so that the forward cables or chains 48 are tightened to allow the trailer to be drawn rearwardly by the pivotal connection 47 in a manner set forth in more detail in connection with Figs. 7 and 8. The main advantages of this form of the invention over the first form shown are that the condition of the drawbar can be controlled from the driver's seat and that a longer bracing action is obtained since the entire space between the two vehicles can be used for the sliding movement of the collar 50. The drawbar may be reenforced as in the first form of the invention so long as any support therefor does not interfere with the sliding movement of the collar 50.

The construction shown in Fig. 6 is similar to the first form of the invention but is designed particularly for use with a lighter trailer. The truck, indicated by the numeral 64 is arranged to be connected to the trailer 65 by means of the drawbar 66 pivoted to the truck as at 67. The drawbar is pivotally connected as at 69 to the rearwardly extending frame member 68 mounted rigidly on the trailer frame so as to position the pivot 69 further to the rear of the axis of the trailer wheels. This results in easier steering of the trailer when being moved rearwardly and causes the rearwardly moving trailer to simulate more accurately the pivotal movements of the forwardly moving trailer. In order that the trailer may have ample freedom for turning with respect to the drawbar the cross brace member 70 which passes beneath the drawbar to guide the same may be placed in rear of the front edge of the trailer as shown.

The drawbar may be secured against transverse movement with respect to the trailer for forward movement by means of the latch bolt 76 passing through the apertured plate 71 carried by said trailer frame and through the drawbar. The drawbar is adapted to be secured against transverse pivotal movement with respect to the truck by means of one or more brace rods 72 (one being shown) connected to the truck as at 73 and detachably secured to the drawbar as at 74. When the rod 72 is not in use it may be carried by a suitable support on the truck as indicated in dotted lines in said Fig. 6. The drawbar may be reenforced as shown in Fig. 1 or otherwise if desired.

In Figs. 7 and 8 I have shown more or less diagrammatically the truck and trailer combination, the parts being shown substantially in the positions they assume when the vehicles move forwardly and rearwardly respectively as indicated by the arrows in said figures.

In Fig. 7 the truck A is connected to the trailer B by means of the drawbar C pivotally connected near the rearward portions of the truck and trailer as indicated at F and G respectively the drawbar in this instance being rigidly connected to the trailer by means of the pin D. It will be seen that as the truck moves forwardly it may turn in any direction and the trailer will follow in the usual manner.

In Fig. 8 the drawbar C is secured against transverse movement with respect to the truck A by means of the rod E. The truck may accordingly be backed and turned at will without any attention being paid to the trailer as the trailer is drawn rearwardly from the pivot G in the same manner it is drawn forwardly by the pivot F as in Fig. 7.

While I have shown and described herein certain specific constructions it is to be understood that these are merely illustrative of the basic principle and that I am to be limited only as set forth in the appended claims.

I claim as my invention:

1. In a vehicle trailer including a single pair of supporting wheels, a drawbar pivoted to said trailer for transverse pivotal movement about a fixed point substantially rearwardly of the vertical plane of the axis of rotation of said wheels.

2. In a vehicle trailer including a single pair of supporting wheels, a drawbar pivoted to said trailer for transverse pivotal movement about a fixed point substantially rearwardly of the vertical plane of the axis of rotation of said wheels and means for locking said drawbar against any material transverse movement relatively to said trailer.

3. In combination with a vehicle trailer, a drawbar pivoted to said trailer for pivotal movement about a fixed point adjacent the rearward portion thereof and extended to a point in front of said trailer, said forward extension including means for attachment to a drawing unit, and means to lock said drawbar against any substantial transverse movement relatively to said trailer.

4. A vehicle trailer comprising a single pair of supporting wheels, a drawbar pivoted to said trailer a substantial distance rearwardly of said supporting wheels for transverse pivotal movement relatively to said trailer, said drawbar being extended toward the front of said trailer, and a guide member carried by said trailer in position to guide said drawbar in its transverse movement relatively to said trailer.

5. A truck and trailer combination comprising a trailer provided with supporting wheels, a drawbar pivotally connected to said trailer behind said wheels, said drawbar being pivotally connected adjacent its forward end to said truck, and means for securing said drawbar from transverse movement with respect to either said truck or said trailer.

6. In combination with a drawing unit, a trailer, connecting means pivotally attached to said trailer behind the center line thereof and to said drawing unit for securing said trailer to said drawing unit, means for securing said connecting means against any material transverse movement with respect to either said trailer or said drawing unit.

7. In combination, a drawing unit, a trailer adapted to be drawn forwardly or rearwardly thereby, a draft mechanism for connecting said trailer to said drawing unit, said draft mechanism being pivotally connected to the rearward portions of both said drawing unit and said trailer.

8. In a trailer construction, a wheel carried frame part, a drawbar pivotally connected to said frame part in rear of the rotative axis of said wheels, said drawbar being mounted for transverse sliding movement with respect to the forward part of said frame part, and manually controlled means for securing said drawbar from transverse movement with respect to said frame part.

9. In a trailer construction, a body part, a supporting axle, supporting springs secured to said body part and to said axle, a drawbar pivotally connected to said body part for pivotal movement about a fixed point substantially rearwardly of said axle, said drawbar being adapted to move transversely with respect to said body part in advance of said pivot, and means for securing said drawbar from any material transverse movement with respect to said body part.

10. In combination with a drawing unit, a trailer, a drawbar pivoted to a rearward portion of said trailer and to said drawing unit for movement with respect to either about a substantially vertical axis, and manually controlled means for limiting the transverse movement of said drawbar with respect to either said drawing unit or said trailer.

11. In combination with a drawing unit, a trailer, a drawbar pivoted to a rearward portion of said trailer and to said drawing unit for movement with respect to either about a substantially vertical axis, and manually controlled means for locking said drawbar from unrestricted transverse movement with respect to either said drawing unit or said trailer, said locking means engaging said drawbar at points remote from the pivotal connections thereof.

12. In a trailer construction, a frame part supported by one pair of wheels, a drawbar pivotally secured to said frame part at a point substantially rearward of said wheels, a transverse supporting guide carried by said frame part in position to guide said drawbar in its transverse movements, and releasable means for securing another portion of said drawbar to said trailer.

13. In a trailer construction, a frame, a pair of wheels for supporting and guiding said trailer, a drawbar, means for securing said drawbar to said trailer, said means permitting said wheels to be drawn and guided from a point in advance of said wheels when said trailer is being moved either forwardly or rearwardly.

14. In combination with a drawing vehicle, a trailer, means for connecting said vehicle and a rearward part of said trailer, said means being normally pivotally connected to said vehicle and held against transverse pivotal movement with respect to said trailer, and means for reversing this arrangement to cause said first mentioned means to be pivotally connected to said trailer for transverse movement with respect thereto and secured against any material transverse pivotal movement with respect to said drawing vehicle.

15. A truck and trailer combination comprising a trailer provided with supporting wheels, a drawbar pivoted to said trailer behind said wheels, said drawbar being pivoted adjacent its forward end to said truck, and means for securing said drawbar from transverse movement with respect to either said truck or said trailer, said means being controllable from a point remote therefrom.

16. In combination, a truck provided with an operator's seat, a trailer provided with supporting wheels, a draft connection pivotally connected to said truck and trailer for transverse movement with respect to either of said vehicles, and means operable from a point adjacent said operator's seat for preventing said draft connection from pivoting transversely with respect to either said truck or trailer.

17. In combination, a truck provided with an operator's seat, a trailer provided with supporting wheels, a draft connection pivotally connected to said truck and trailer for transverse movement with respect to either of said vehicles, means for locking said draft connection against any material transverse movement with respect to either said truck or said trailer, controlling means operatively associated with said locking means and extending to a point adjacent said operator's seat, and an operating member mounted adjacent said operator's seat and connected to said controlling means to permit operation of said locking means from a point adjacent said operator's seat.

Signed at New York in the county of New York and State of New York, April A. D., 1925.

VIRGIL C. KLINE.